United States Patent
Ming et al.

(10) Patent No.: US 8,000,528 B2
(45) Date of Patent: Aug. 16, 2011

(54) METHOD AND APPARATUS FOR AUTHENTICATING PRINTED DOCUMENTS USING MULTI-LEVEL IMAGE COMPARISON BASED ON DOCUMENT CHARACTERISTICS

(75) Inventors: Wei Ming, Cupertino, CA (US); Yibin Tian, Menlo Park, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 86 days.

(21) Appl. No.: 12/648,931

(22) Filed: Dec. 29, 2009

(65) Prior Publication Data

US 2011/0158483 A1    Jun. 30, 2011

(51) Int. Cl.
*G06K 9/34* (2006.01)
*G06K 9/00* (2006.01)

(52) U.S. Cl. ........ 382/173; 382/112; 382/180; 382/176; 382/177

(58) Field of Classification Search ............... 382/112, 382/137–140, 173–180
See application file for complete search history.

(56) References Cited

U.S. PATENT DOCUMENTS

| | | | | |
|---|---|---|---|---|
| 6,141,438 | A * | 10/2000 | Blanchester | 382/140 |
| 6,731,800 | B1 * | 5/2004 | Barthel et al. | 382/176 |
| 7,131,112 | B1 * | 10/2006 | Bartz et al. | 717/122 |
| 7,593,961 | B2 * | 9/2009 | Eguchi et al. | 1/1 |
| 7,783,108 | B2 * | 8/2010 | Aoyagi | 382/176 |
| 7,876,471 | B2 * | 1/2011 | Tojo | 358/1.18 |
| 2004/0258276 | A1 * | 12/2004 | Ishii et al. | 382/100 |

* cited by examiner

*Primary Examiner* — Wesley Tucker
(74) *Attorney, Agent, or Firm* — Chen Yoshimura LLP

(57) ABSTRACT

A document authentication method compares a target document image (scanned image) with an original document image at multiple levels, such as block (e.g. paragraph, graphics, image), line, word and character levels. The paragraph level comparison determines whether the target and original images have the same number of paragraphs and whether the paragraphs have the same sizes and locations; the line level comparison determines if the target and original images have the same number of lines and whether the lines have the same sizes and locations; etc. Document segmentation is performed on the target and original images to segment them into paragraph units, line units, etc. for purposes of the comparisons. The original document may be segmented beforehand and the segmentation information stored for later use. The authentication process may be designed to stop when alterations are detected at a higher level, so lower level comparisons are not carried out.

16 Claims, 3 Drawing Sheets

METHOD AND APPARATUS FOR AUTHENTICATING PRINTED DOCUMENTS USING MULTI-LEVEL IMAGE COMPARISON BASED ON DOCUMENT CHARACTERISTICS

BACKGROUND OF THE INVENTION

1. Field of the Invention

This invention relates to a method for detecting alterations in a printed document by comparing a scanned image of the document and an original digital version of the document. In particular, it relates to an image comparison method that uses multiple levels of comparisons based on document characteristics.

2. Description of Related Art

A closed-loop process refers to printing an original digital document (which may include text, graphics, images, etc.), using the printed hardcopy of the document such as distributing it, copying it, etc., and then scanning a hardcopy of the document back into digital form. Authenticating a scanned digital document refers to determining whether the scanned document is an authentic copy of the original digital document, i.e., whether the document has been altered while it was in the hardcopy form. Various types of document authentication and alteration detection methods have been proposed. A goal in many document authentication methods is to detect what the alterations (additions, deletions) are. Alternatively, some document authentication methods determine whether or not the document has been altered, without determining what the alterations are.

One type of document authentication method performs an image comparison of the scanned document with the original digital document. This is sometimes referred to as a pixel-based alteration detection method. In another type of document authentication method, data representing or relating to the document content are encoded in barcodes, and the barcodes are printed on the document itself to assist in document authentication later.

In conventional pixel-based alteration detection methods, the original digital image and the scanned image are compared pixel-by-pixel to determine whether there are alterations in the scanned image. The high spatial resolution of both the printer and the scanner result in high resolution scanned images. Exhaustive image comparison processing of the whole image in a conventional alteration detection method is computationally intensive.

SUMMARY

The present invention is directed to an improved method for authenticating a document by performing multiple levels of comparisons (multi-level comparison) of the scanned document with the original digital document.

An object of the present invention is to provide an alteration detection method based on image comparison that has improved performance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for authenticating a target document image by comparing the target document image with an original document image, which includes: comparing the target document image with the original document image at a first level, including: (a) segmenting the target document image into a plurality of first-level units; (b) segmenting the original document image into a plurality of first-level units; (c) comparing the plurality of first-level units in the target document image with the plurality of first-level units in the original document image to detect alterations in the target document image; and if no alteration is detected in step (c), comparing the target document image with the original document image at a second level, including: (d) segmenting the target document image into a plurality of second-level units, wherein the second-level units are smaller than the first-level units; (e) segmenting the original document image into a plurality of second-level units, wherein the second-level units are smaller than the first-level units; and (f) comparing the plurality of second-level units in the target document image with the plurality of second-level units in the original document image to detect alterations in the target document image.

Further, step (c) may include: (c1) comparing a count of the first-level units in the target document image with a count of the first-level units in the original document image to detect alterations in the target document image; and (c2) if no alteration is detected in step (c1), comparing a size and a location of each first-level unit in the target document image with a size and a location of a corresponding first-level unit in the original document image to detect alterations in the target document image. Step (f) may include: (f1) comparing a count of the second-level units in the target document image with a count of the second-level units in the original document image to detect alterations in the target document image; and (f2) if no alteration is detected in step (f1), comparing a size and a location of each second-level unit in the target document image with a size and a location of a corresponding second-level unit in the original document image to detect alterations in the target document image.

The first-level units in the target and original document images may be block units each containing a paragraph of text, or a graphic object, or an image object and wherein the second-level units in the target and original document images may be line units each containing a line of text, or word units each containing a word of text, or character units each containing a character of text.

In another aspect, the present invention provides a computer program product comprising a computer usable medium (e.g. memory or storage device) having a computer readable program code embedded therein that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1A:
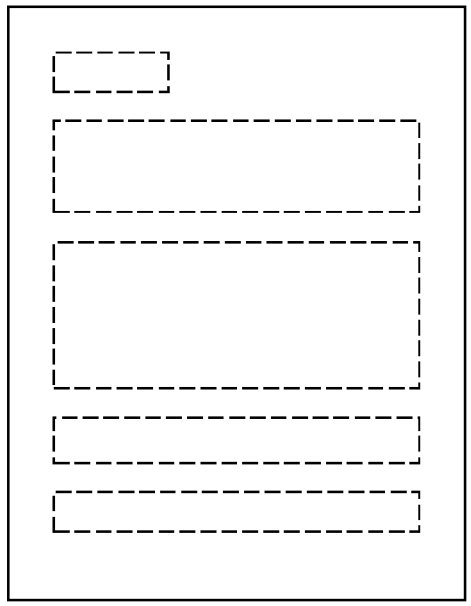
FIGS. 1a, 1b and 1c schematically illustrate document images segmented into block units, line units, and word unites, respectively.

The alteration detection method described here may be implemented by software or firmware stored in a memory and executed by any suitable data processing apparatus, such as a computer, a printer or scanner having a data processing section, etc. In this regard, computer executable software, which is coded for realizing the method described below, may be stored in a computer memory accessed by a central processing unit (CPU) or a micro processing unit (MPU) of the suitable data processing apparatus. The computer is connected to a mass storage device for storing documents and other data. The printing and scanning steps may be performed by any printer and scanner, or an all-in-one device that combines a printing section and scanning section in a single device. The structures of these devices and apparatuses are well known and not described in detail here.

Embodiments of the present invention provide a document alteration detection method (also referred to as a document authentication method) based on an image-comparison approach, which performs image comparison at multiple levels. More specifically, the document authentication method compares a scanned digital document image (referred to as the target document image herein) with an original digital document image (referred to as the original document image) at multiple levels, from a high-level comparison (i.e. a more coarse comparison) to progressively lower levels of comparison (i.e. finer comparisons), to detect alterations in the target document image. For example, a high level comparison may be a comparison at a block level to determine if the target document image has the same number of blocks as the original document image and whether the blocks have approximately the same sizes and locations in the target and original document images. Each block unit may contain a paragraph of text, an image or graphic object, etc. A lower level comparison may be at a line level to determine if the target and original document images have the same number of lines and whether the lines have approximately the same sizes and locations in the target and original document images. An even lower level comparison may be at a word level, a character level, etc.

The authentication process may be designed so that once an alteration is detected at a certain level, the process stops with a message to the user that an alteration has been detected, so that no further comparisons at lower levels are performed. Alternatively, the process may be designed to be interactive, so that when an alteration is detected, the data processing apparatus informs a user of the result, and the user may choose whether to proceed with further comparisons or to stop.

The multi-level image comparison method is based on the assumption that a document structure is usually hierarchical, and the layout structure of a document is usually also hierarchical. The method takes advantage of the hierarchical characteristics of the document to provide different levels of authentication solutions.

To perform multi-level image comparison, both the target document image and the original document image are segmented at different levels into different levels of units, including block units, line units, word units, and character units. Each such segmented unit is defined by its bounding box, which is a box (preferably rectangular) that bounds the units from all sides. This process is referred to as image segmentation. Generally, the bounding boxes of lower level units are smaller than the bounding boxes of higher level units, and a bounding box of a higher level unit will completely enclose a number of bounding boxes of lower level units.

Figure 1B:
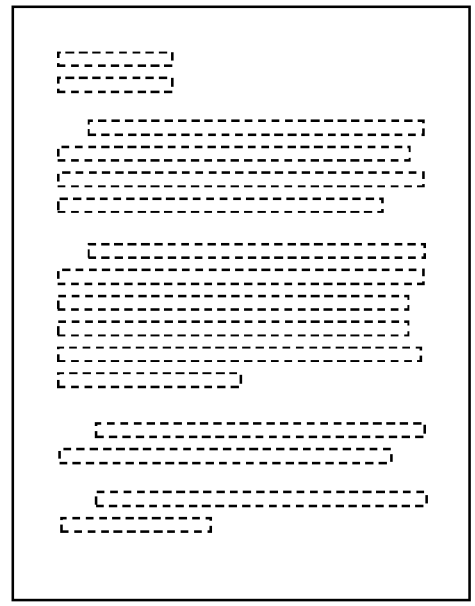
Figure 1C:
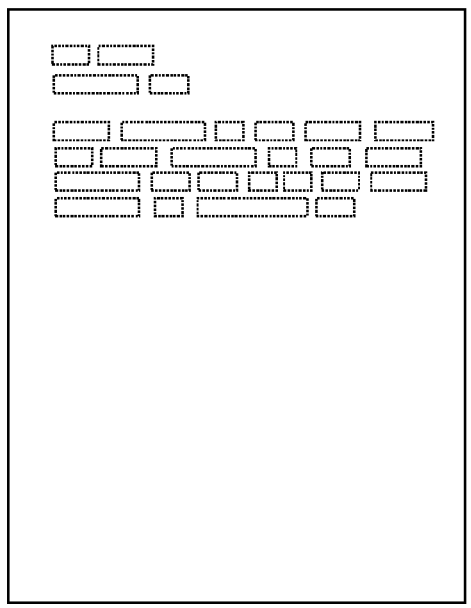

FIGS. 1a, 1b and 1c schematically illustrate image segmentation. In FIG. 1a, a page of document image (indicated by the solid line boundary) is shown as being segmented into a plurality of block units each indicated by a broken line rectangle. In FIG. 1b, a page of document image is shown as being segmented into a plurality of line units each indicated by a broken line rectangle. In FIG. 1c, a page of document image (only a few lines of text are shown) is shown as being segmented into a plurality of word units each indicated by a broken line rectangle.

Many methods can be used to accomplish image segmentation. In one method, a horizontal histogram (or horizontal projection) is generated by plotting, along the vertical axis, the number of non-white pixels in each row of pixels. Such a horizontal histogram will tend to have segments of low values corresponding to white spaces between lines of text, and segments (approximately equal width) of higher values corresponding to lines of text. Such histograms can therefore be used to identify line units for document segmentation. Further, if paragraph spacing is different from line spacing in the document, block (e.g. paragraph) units can be identified from such histograms (where larger gaps in the histogram would indicate paragraph breaks and smaller gaps in the histogram would indicate line breaks). Additional starting and ending information of lines may be helpful for block extraction. Further, in the case of multiple objects and complicated layout design, the existence of different types of objects in some area can be identified by analyzing the distribution of the histogram, and then data block can be extracted by analyzing vertical projection in that area.

Further, for each line unit that has been identified, a vertical histogram (ore vertical projection) may be generated by plotting, along the horizontal axis, the number of non-white pixels in each column of pixels. Such a vertical histogram will tend to have segments of low values corresponding to white spaces between characters of text, and segments of higher values corresponding to the characters. In addition, larger white spaces in a vertical histogram may correspond to white spaces between words and can be used to identify words. Thus, using vertical and horizontal histograms, text in a document can be segmented into block (e.g. paragraph) units, line units, word units, and character units.

In another document segmentation method, a morphological dilation operation is performed on the image, so that nearby characters merge into dark blocks corresponding to word units. Dilation is a well-known technique in morphological image processing which generally results in an expansion of the dark areas of the image. Once the characters are merged into word units, they can be further grouped to form line units and block (e.g. paragraph) units.

In another document segmentation method, connected image components (e.g. connected groups of pixels in the case of a binary image) may be identified as corresponding to characters, and character units are formed from these connected image components. Once character units are formed, they can be grouped to form word units, line units, and block (e.g. paragraph) units.

Other document segmentation methods also exist. Some such methods are knowledge based, which uses knowledge of document structure to segment the image.

According to embodiments of the present invention, the multi-level authentication method segments the target and original document images into different levels of units, and compares the number (count) of units in each level in the two images as well as the bounding box size and location of each unit in the two images. The process starts at higher level units (block units, line units, etc.), and can be stopped at any level once an alteration is found.

Figure 2A:
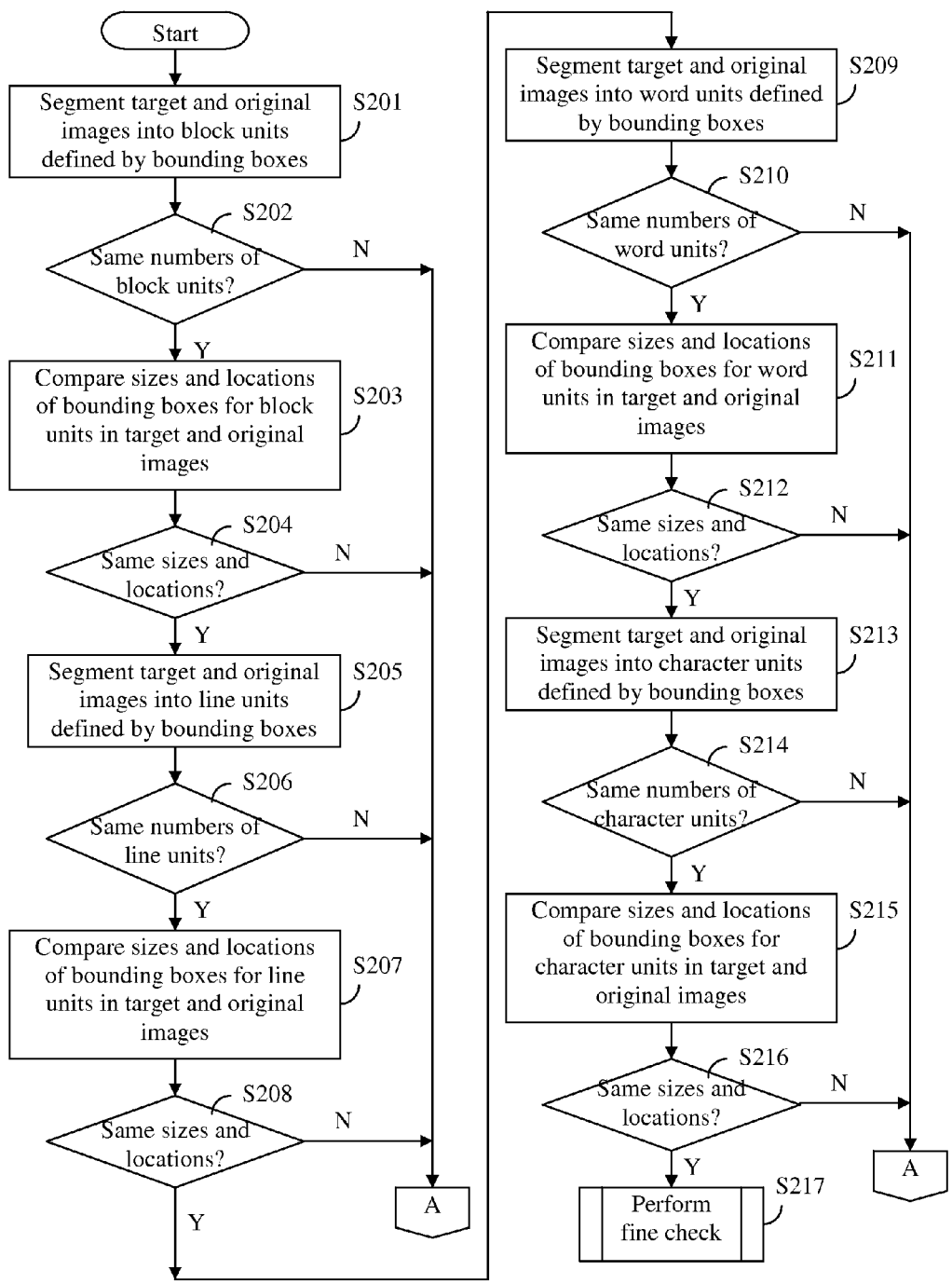
FIG. 2a illustrates a document authentication method using multi-level comparisons according to an embodiment of the present invention.

More specifically, as illustrated in FIG. 2a, the process first segments the target and original document images into block units, each block unit being defined by a bounding box (step S201). The counts of block units in the target and original document images are compared (step S202). If the counts are different ("N" in step S202), the target document is judged as having been altered, and an appropriate message may be displayed or further processing may be carried out (step A, described later). If the count of block units in the target and original document images are the same ("Y" in step S202), the sizes and locations of the corresponding bounding boxes in the target and original document images are compared (step S203). If the sizes or locations of any corresponding bounding boxes in the target and original document images are different ("N" in step S204), the target document is judged as having been altered, and an appropriate message may be displayed or further processing may be carried out (step A).

When comparing the sizes and locations of corresponding bounding boxes in the target and original document images, a tolerance of, e.g., a few pixels, may be given, so that two bounding boxes are considered to have the same size or location for purpose of the comparison if their size difference or location difference is within the tolerance.

Steps S201 to S204 may be collectively referred to as a step of "segmenting the target and original document images into block units and comparing the block units to detect alterations".

If all corresponding bounding boxes in the target and original document images are of the same sizes and locations ("Y" in step S204), the process continues, and the target and original document images are segmenting into line units, each line unit being defined by a bounding box (step S205). Similar to the block-level comparison, at the line-level, the process first determines whether the number (count) of line units are the same in the target and original document images (steps S206), and then compares the sizes and locations of the corresponding bounding boxes in the target and original document images (steps S207, S208). If the counts of line units are different ("N" in step S206) or if the sizes or locations of any corresponding bounding boxes are different ("N" in step S208), the target document is judged as having been altered, and an appropriate messages may be displayed or further processing may be carried out (step A).

Steps S205 to S208 may be collectively referred to as a step of "segmenting the target and original document images into line units and comparing the line units to detect alterations".

After the line-level comparison and if no alteration is detected ("Y" in step S208), word-level comparison is performed in steps S209 to S212. After the word-level comparison and if no alteration is detected ("Y" in step S212), character-level comparison is performed in steps S213 to S216. These two levels of comparisons include similar steps as the block- and line-level comparisons, and their detailed descriptions are omitted. Steps S209 to S212 may be collectively referred to as a step of "segmenting the target and original document images into word units and comparing the word units to detect alterations". Steps S213 to S216 may be collectively referred to as a step of "segmenting the target and original document images into character units and comparing the character units to detect alterations".

If no alterations are detected in the block-, line-, word- and character-level detection steps ("Y" in step S216), the process proceeds to perform a further alteration detection step (fine check) (step S217). The fine check step performs an overall comparison of the target and original document images, or selected portions thereof, in a non-hierarchical manner. The fine check step may employ known image comparison methods such as direct pixel-by-pixel comparison of two bitmap images, skeleton comparison using the center line (skeleton) of each text character, edge extraction and edge map comparison, similarity check, comparison of histograms in both vertical and horizontal directions, decomposition method (performing Fourier or cosine transform and comparing the transforms), etc. One image comparison method which can be used as the fine check step is a method that compares centroid locations, as described in commonly owned, co-pending U.S. patent application Ser. No. 12/495,749, filed Jun. 30, 2009, entitled "Method for Detecting Alterations in Printed Document Using Image Comparison Analyses". Other suitable image comparison methods can be used for the fine check step, including those developed in the future. The fine check step S217 includes displaying an appropriate message to indicate the result of the comparison, e.g., whether any alteration is detected, the locations of the altered areas, etc.

Figure 2B:
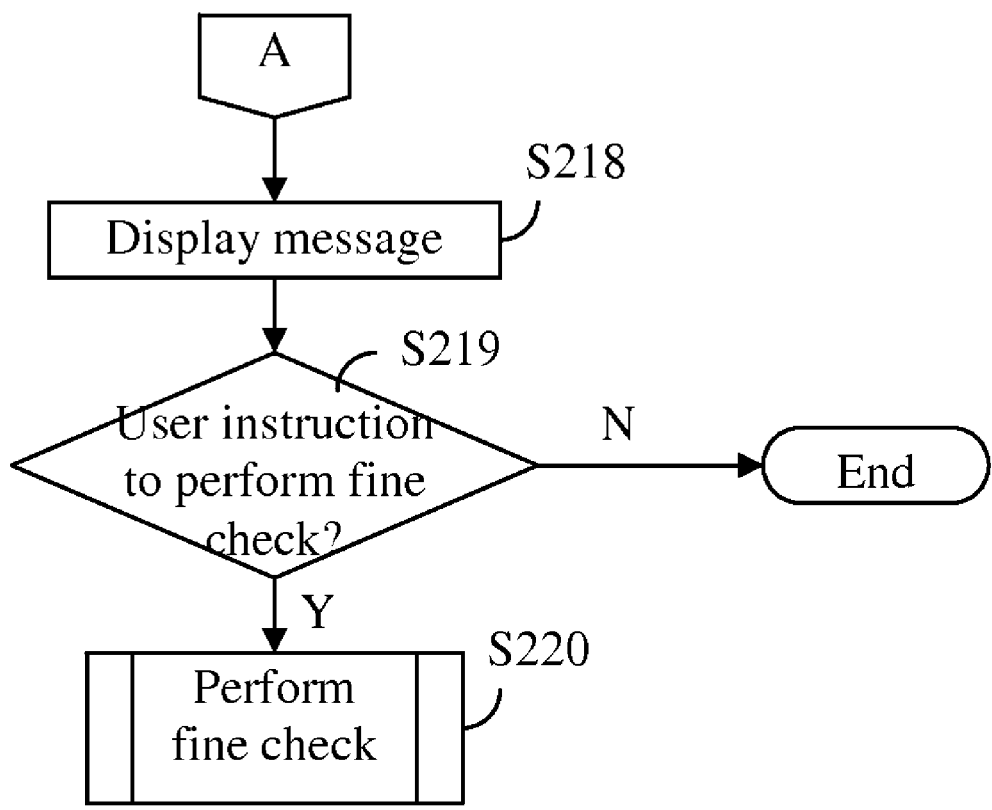
FIG. 2b illustrates further processing steps of the document authentication method.

At any level, if an alteration is detected, i.e., "N" in steps S202, S204, S206, S208, S210, S212, S214 and S216, a subsequent process is carried out as shown in FIG. 2b. Some steps in FIG. 2b are optional depending on the implementation. In a simple implementation, the process displays a message (step S218) and terminates. The message may be a generic message indicating that alterations have been detected, or a specific message that additionally indicates the type of the alteration, such as "Block counts are different". The message may also include an image to indicate where the detected alterations are located in the document image. For example, if the third block in the target document image has a different size than the third block of the original document image, an image may be displayed which shows a highlighted box to indicate the third block of the target or original document. Of course, in order to generate such specific messages, the alternation detection steps in FIG. 2a will need to use different flags or other means to indicate the different types of alterations that has been detected.

In another implementation, the process may attempt to make further determinations of the nature of the alterations. In one example, if the counts of blocks are different in the target and original document images, the process may attempt to determine whether whole blocks are deleted or added by comparing sizes and locations of block units. For example, if it is determined that the block units 1 to 3 in the target and original document images have the same sizes and locations, and that block units 4 to 6 in the target document image have the same sizes as block units 5 to 7 of the original document image, the process displays a message to the user suggesting that block unit 4 in the original document image may have been deleted in the target document image.

In a more interactive implementation, the message displayed in step S218 includes a prompt for the user to enter an instruction, such as to terminate the process or to perform further detection (fine check). As shown in FIG. 2b, if a user instruction to perform fine check is received ("Y" in step S219), a fine check process is carried out (step S220), which may be similar or identical to the fine check step S217.

Alternatively, the fine check steps S217 and S220 may be optional, and a user may set a security level parameter to determine the conditions for performing fine check. For example, the security parameter may be set at a level so that if the block-, line-, word- and character-level detections detected no alterations, then no fine check is performed. Or, the security parameter may be set at a level so that fine check will be performed if block-, line- and word-level alterations are detected, but not when only character-level alterations are detected; etc. The flow charts in FIGS. 2a and 2b will be modified accordingly to accommodate such flexibilities.

Alternative detection criteria may be implemented. For example, the authentication process may be designed to generate two types of messages, such as "warning" and "error"

depending on the nature of the alterations detected. In one example, when grouping blocks, a stricter or a more tolerant threshold may result in different grouping results. Thus, an error message is generated when a grouping difference is found under a more tolerant threshold, but a warning message is generated when a grouping difference is found only under a stricter threshold. In another example, when an extra block is detected in the target document, but its size is small and its location is at the border of the page, then only a warning message is generated because it has a greater possibility of being noise. When two levels of messages ("warning" and "error") are employed, the process may be designed to stop when an error is detected, but to continue (while displaying appropriate messages) when only warnings are detected.

In the process shown in FIG. 2a, segmentation of the original document image may be performed beforehand and the result stored in a database in association with the original document image. Thus, if multiple target document images are requested to be authenticated against the same original document image, the stored segmentation information is retrieved from the database, and the segmentation process for the original document image does not need to be repeated. Alternatively, as shown in FIG. 2a, document segmentation is performed independently for the target and original document images at the time of the authentication process.

Further, if a source version of the original document, such as a Word or PDF version, is available, segmentation of the original document image may be done by utilizing the source version.

Moreover, when the document segmentation of the original document image is already available, the segmentation of the target document image may take advantage of the known segmentation of the original document image. Thus, the process may attempt to look for the same block units, line units, etc. in the target document image at the locations of the known units in the original document image, rather than attempting to segment the target document image from scratch. In other words, the process attempts to verify whether the same segmentation in the original document image is also present in the target document image.

The segmentation information for the original may be stored in a file format, such as XML, SGML, etc., that allows parsing. Thus, if authentication is requested for specific areas of the document only, the file storing the segmentation information may be parsed and the corresponding tags can be found in order to perform authentication for the specified areas.

From the above descriptions, it can be seen that the multi-level comparison method according to embodiments of the present invention takes advantage of the hierarchical nature of a document's layout, so that certain alternations can be quickly detected without performing a full image comparison. This improves the performance of document authentication.

The above-described document authentication process is relatively robust and resistant to degradation of the document image quality introduced by the print and scan process. This is because the number of block units, line units, word units and character units should not change in the print and scan process, even if the characters have become fatter or thinner due to print and scan. Further, if the characters become fatter or thinner due to print and scan, such changes tend to be consistent throughout the whole image. Thus, any changes in the sizes of bounding boxes due to the characters becoming fatter or thinner will be relatively consistent throughout the image. Further, even if the printer or scanner has non-uniform characteristics, which result in inconsistent size changes within the image, abrupt size change among neighbor units would not be expected It will be apparent to those skilled in the art that various modification and variations can be made in the document authentication method using multi-level image comparison of the present invention without departing from the spirit or scope of the invention. Thus, it is intended that the present invention cover modifications and variations that come within the scope of the appended claims and their equivalents.

What is claimed is:

1. A method implemented in a data processing apparatus for authenticating a target document image by comparing the target document image with an original document image, comprising:

comparing the target document image with the original document image at a first level, including:
(a) segmenting the target document image into a plurality of first-level units;
(b) segmenting the original document image into a plurality of first-level units;
(c) comparing the plurality of first-level units in the target document image with the plurality of first-level units in the original document image to detect alterations in the target document image; and
if no alteration is detected in step (c), comparing the target document image with the original document image at a second level, including:
(d) segmenting the target document image into a plurality of second-level units, wherein the second-level units are smaller than the first-level units;
(e) segmenting the original document image into a plurality of second-level units, wherein the second-level units are smaller than the first-level units; and
(f) comparing the plurality of second-level units in the target document image with the plurality of second-level units in the original document image to detect alterations in the target document image.

2. The method of claim 1, wherein step (c) includes:
(c1) comparing a count of the first-level units in the target document image with a count of the first-level units in the original document image to detect alterations in the target document image; and
(c2) if no alteration is detected in step (c1), comparing a size and a location of each first-level unit in the target document image with a size and a location of a corresponding first-level unit in the original document image to detect alterations in the target document image; and
wherein step (f) includes:
(f1) comparing a count of the second-level units in the target document image with a count of the second-level units in the original document image to detect alterations in the target document image; and
(f2) if no alteration is detected in step (f1), comparing a size and a location of each second-level unit in the target document image with a size and a location of a corresponding second-level unit in the original document image to detect alterations in the target document image.

3. The method of claim 1, wherein the first-level units in the target and original document images are block units each containing a paragraph of text, or a graphic object, or an image object, and wherein the second-level units in the target and original document images are line units each containing a line of text, or word units each containing a word of text, or character units each containing a character of text.

4. The method of claim 1, wherein the first-level units in the target and original document images are line units each containing a line of text, and wherein the second-level units in the target and original document images are word units each containing a word of text or character units each containing a character of text.

5. The method of claim 1, wherein the first-level units in the target and original document images are word units each containing a word of text, and wherein the second-level units in the target and original document images are character units each containing a character of text.

6. The method of claim 1, further comprising:
if no alteration is detected in step (f), performing an overall comparison of the target and original document images or selected portions thereof to detect alterations in the target document image.

7. The method of claim 1, wherein if alterations are detected in step (c) or step (f), displaying a message indicating that an alteration has been detected.

8. The method of claim 7, wherein the message further indicates a type of the alteration.

9. A computer program product comprising a computer usable medium having a computer readable program code embedded therein for controlling a data processing apparatus, the computer readable program code configured to cause the data processing apparatus to execute a process for authenticating a target document image by comparing the target document image with an original document image, the process comprising:
comparing the target document image with the original document image at a first level, including:
(a) segmenting the target document image into a plurality of first-level units;
(b) segmenting the original document image into a plurality of first-level units;
(c) comparing the plurality of first-level units in the target document image with the plurality of first-level units in the original document image to detect alterations in the target document image; and
if no alteration is detected in step (c), comparing the target document image with the original document image at a second level, including:
(d) segmenting the target document image into a plurality of second-level units, wherein the second-level units are smaller than the first-level units;
(e) segmenting the original document image into a plurality of second-level units, wherein the second-level units are smaller than the first-level units; and
(f) comparing the plurality of second-level units in the target document image with the plurality of second-level units in the original document image to detect alterations in the target document image.

10. The computer program product of claim 9, wherein step (c) includes:
(c1) comparing a count of the first-level units in the target document image with a count of the first-level units in the original document image to detect alterations in the target document image; and
(c2) if no alteration is detected in step (c1), comparing a size and a location of each first-level unit in the target document image with a size and a location of a corresponding first-level unit in the original document image to detect alterations in the target document image; and
wherein step (f) includes:
(f1) comparing a count of the second-level units in the target document image with a count of the second-level units in the original document image to detect alterations in the target document image; and
(f2) if no alteration is detected in step (f1), comparing a size and a location of each second-level unit in the target document image with a size and a location of a corresponding second-level unit in the original document image to detect alterations in the target document image.

11. The computer program product of claim 9, wherein the first-level units in the target and original document images are block units each containing a paragraph of text, or a graphic object, or an image object, and wherein the second-level units in the target and original document images are line units each containing a line of text, or word units each containing a word of text, or character units each containing a character of text.

12. The computer program product of claim 9, wherein the first-level units in the target and original document images are line units each containing a line of text, and wherein the second-level units in the target and original document images are word units each containing a word of text or character units each containing a character of text.

13. The computer program product of claim 9, wherein the first-level units in the target and original document images are word units each containing a word of text, and wherein the second-level units in the target and original document images are character units each containing a character of text.

14. The computer program product of claim 9, further comprising:
if no alteration is detected in step (f), performing an overall comparison of the target and original document images or selected portions thereof to detect alterations in the target document image.

15. The computer program product of claim 9, wherein if alterations are detected in step (c) or step (f), displaying a message indicating that an alteration has been detected.

16. The computer program product of claim 15, wherein the message further indicates a type of the alteration.

* * * * *